Sept. 15, 1959     D. C. HEITSHU     2,904,341
LEVELLING MECHANISM FOR HILLSIDE OPERATING VEHICLES
Original Filed April 1, 1954     3 Sheets-Sheet 1

*INVENTOR*
D. C. HEITSHU

Sept. 15, 1959     D. C. HEITSHU     2,904,341
LEVELLING MECHANISM FOR HILLSIDE OPERATING VEHICLES
Original Filed April 1, 1954     3 Sheets-Sheet 2
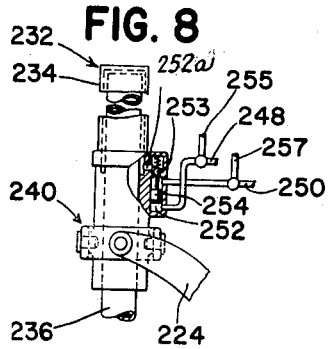
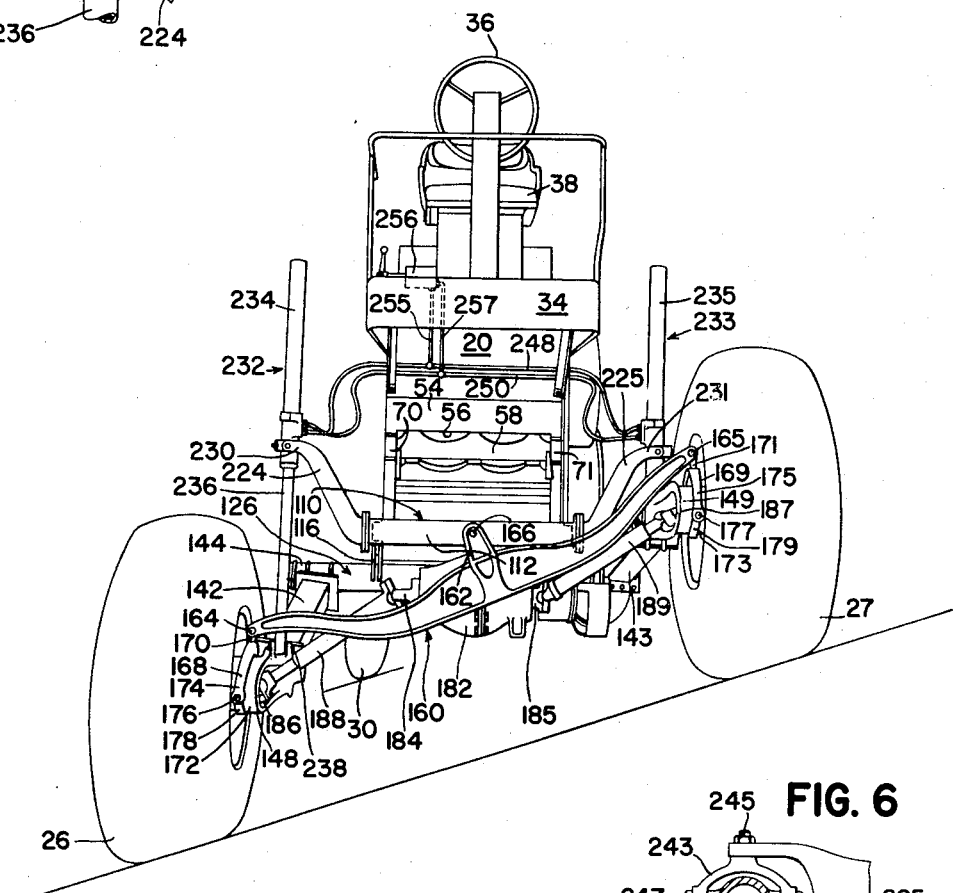
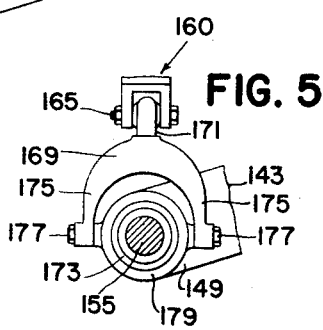
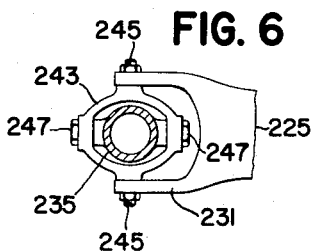
INVENTOR
D. C. HEITSHU Sept. 15, 1959     D. C. HEITSHU     2,904,341
LEVELLING MECHANISM FOR HILLSIDE OPERATING VEHICLES
Original Filed April 1, 1954     3 Sheets-Sheet 3
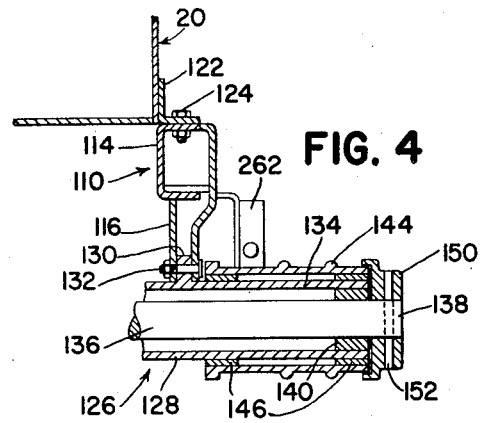
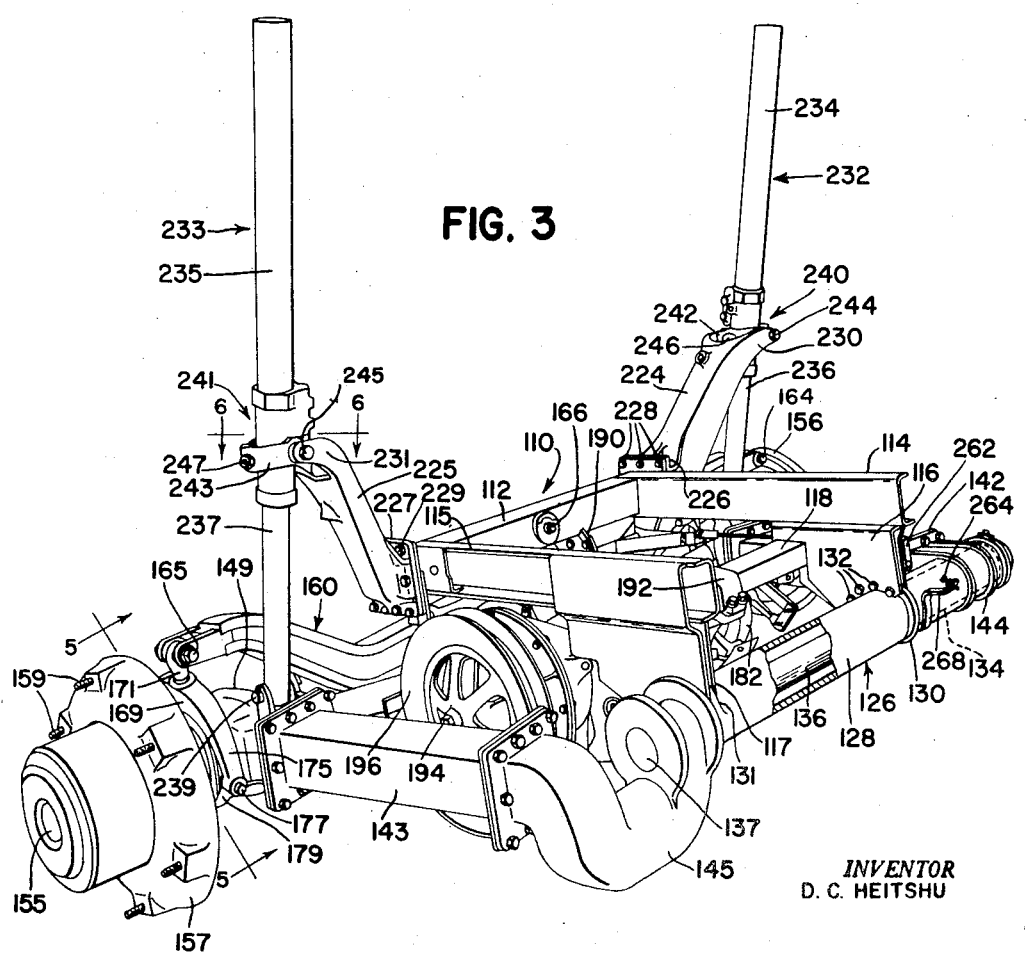
*INVENTOR*
D. C. HEITSHU

United States Patent Office 2,904,341
Patented Sept. 15, 1959

2,904,341

LEVELLING MECHANISM FOR HILLSIDE OPERATING VEHICLES

Daniel C. Heitshu, Moline, Ill., assignor, by mesne assignments, to Deere & Company, a corporation of Delaware Original application April 1, 1954, Serial No. 420,284, now Patent No. 2,821,059, dated January 28, 1958. Divided and this application October 22, 1956, Serial No. 617,627

2 Claims. (Cl. 280—6.11)

This invention relates to a harvester and more particularly to a harvester having adjustable components enabling the harvester to operate on hillsides or other slopes transverse to the line of advance of the machine. This application is a division of copending application Ser. No. 420,284, filed April 1, 1954, now Patent No. 2,821,059.

Hillside harvesters have long been known as specially designed machines used primarily in the Northwestern area of the United States for harvesting grain in hilly and mountainous areas. In the past, the basic type of machine comprised a longitudinal body drawn by a tractor and having a laterally outwardly extending header or platform. Means were provided for maintaining the level of the body while the wheels and header accommodated themselves to the transverse slope. The advent of the self-propelled harvester introduced many complications into the design of hillside harvesters and because of these complications many of the advantages of the self-propelled machine could not be utilized in the hillside machine. These problems arose primarily out of difficulty in coordinating the leveling of the body with the ability of the wheels and header to accommodate themselves to the slopes, which in turn gave rise to serious problems of stability and maneuverability.

The purpose of course of maintaining the level of the body while the wheels and header accommodate themselves to various angles is to retain the efficiency of the threshing mechanism, the various parts of which are designed for normal operation in planes parallel to the horizontal. In some cases this result is accomplished by allowing tilting of the body but leveling of the various threshing components. By far, the presently accepted method is to level the entire body, which result is accomplished by the provision of vertically adjustable wheels, normally of the individually suspended type that are thus capable of remaining in their respective vertical planes regardless of the height of one wheel relative to the other. Thus, on any particular slope, a line transverse to the line of travel and intersecting the centers of the wheels at the opposite sides of the body will be theoretically parallel to the transverse slope. Since the grain obviously grows on the same slope or on a slope not materially different from that traveled by the wheels, the header must occupy approximately the same transverse position. Rather than to allow the header merely to accommodate itself to the slope without some control thereover, it is desirable to connect the header and the wheels in such manner that the angle of the header is compelled to follow that of the wheels. This is one of the primary objects of the present invention.

Specifically, that object is achieved by the provision of a design in which the wheels are individually mounted and are cross-connected by a transverse rigid equalizer bar pivoted at its center to the longitudinal center line of the body and pivoted at its outer ends respectively to the wheels so that as one wheel moves up the other wheel moves down in an equal amount.

Further objects of the invention reside in the provision of novel wheel-mounting means, particularly in connection with a subframe that sustains the forward end of the machine; in the utilization of the subframe as a basis for the mounting of the equalizer; in the mounting on the subframe of a drive mechanism casing furnishing power to the front wheels, which are conventionally traction wheels; in the novel means for supporting hydraulic control means for the wheels; and in the provision of the wheel-mounting structure, which includes the subframe and the above related components, as a unit that may be readily attached to or demounted from a harvester of otherwise conventional design, whereby such conventional harvester may be easily converted to a hillside harvester.

The foregoing and other important objects and desirable features inherent in and encompassed by the invention will become apparent as a preferred embodiment of the invention, with specifically different forms thereof in some aspects, is disclosed in detail in the following specification and accompanying sheets of drawings, the several figures of which will be described immediately below.

Fig. 2 is a front view of the machine shown in operation on a slope that inclines downwardly to the right of the machine.

Fig. 3 is a perspective view showing the details of the subframe and wheel-mounting structure, parts of the tubular member being broken away to expose the inner shaft.

Fig. 4 is an enlarged fragmentary sectional view as seen along the line 4—4 of Fig. 1.

Fig. 5 is a fragmentary sectional view as seen along the line 5—5 of Fig. 3.

Fig. 6 is a fragmentary transverse sectional view as seen along the line 6—6 of Fig. 3.

Fig. 8 is a view of the right-hand leveling motor, partly in section and drawn to a scale larger than that of Figs. 1 and 2.

Figure 7:
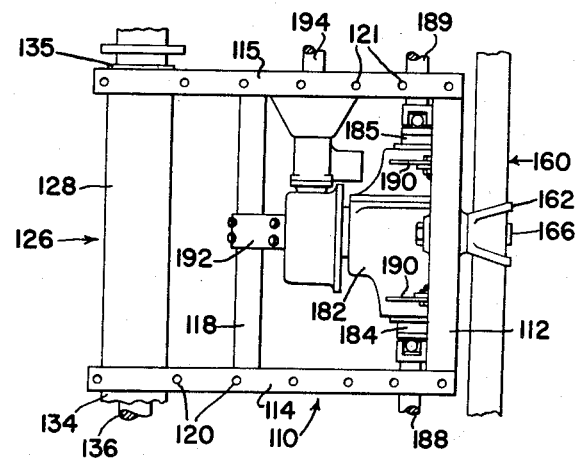
Fig. 7 is a partial plan view of the structure shown in Fig. 3.

Throughout this description the words "right" and "left" are used with reference to the position of an observer standing behind the machine and looking forwardly, it being understood that the large traction wheels are at the front of the machine and that the steerable wheels are at the rear of the machine. These terms, like the expressions "front," "rear," "top," "bottom," etc., are used primarily for the purposes of convenience and clarity and not as establishing any limits on the scope of the invention.

The general design of the machine is such as to produce a harvester having a longitudinal body 20 having front and rear ends 22 and 24 and carried at its front end at opposite sides thereof by right- and left-hand traction wheels 26 and 27 and at its rear end by an axle structure 28 having right- and left-hand steerable wheels 30 and 31. An upper forward portion of the body 20 carries an operator's station 34 having a steering wheel 36 for steering the wheels 30 and 31 and a seat 38 affording a vantage point for the operator.

The body 20 is intended to carry a forwardly extending feeder house, and a transverse platform or header, omitted here as unnecessary to an understanding of the present invention.

The front end of the main or separator body has a transverse wall 54 formed with a rectangular feed opening 56 (Fig. 4) through which grain cut by the header is delivered to the interior of the body. Part of the threshing mechanism may be seen at 58 through the opening 56 as exposed in Fig. 2.

The front wall 54 has right- and left-hand bearing members 70 and 71 for effecting the pivotal connection of the feeder house to the body.

The wheel-mounting structure is best shown in Figs. 2 and 3, with details thereof emphasized in Figs. 4, 5, 6 and 7. Reference will be had first to Figs. 3 and 7, wherein there is illustrated a subframe, designated generally by the numeral 110, which serves as the basic mount for the front traction wheels 26 and 27. In its broader aspects, the invention contemplates the mounting of the wheels directly on the body by any type means, of which that shown in Fig. 3 is representative, but the Fig. 3 design is specifically advantageous as a unit construction enabling conversion of a conventional self-propelled harvester to a self-propelled hillside harvester.

Figure 1:
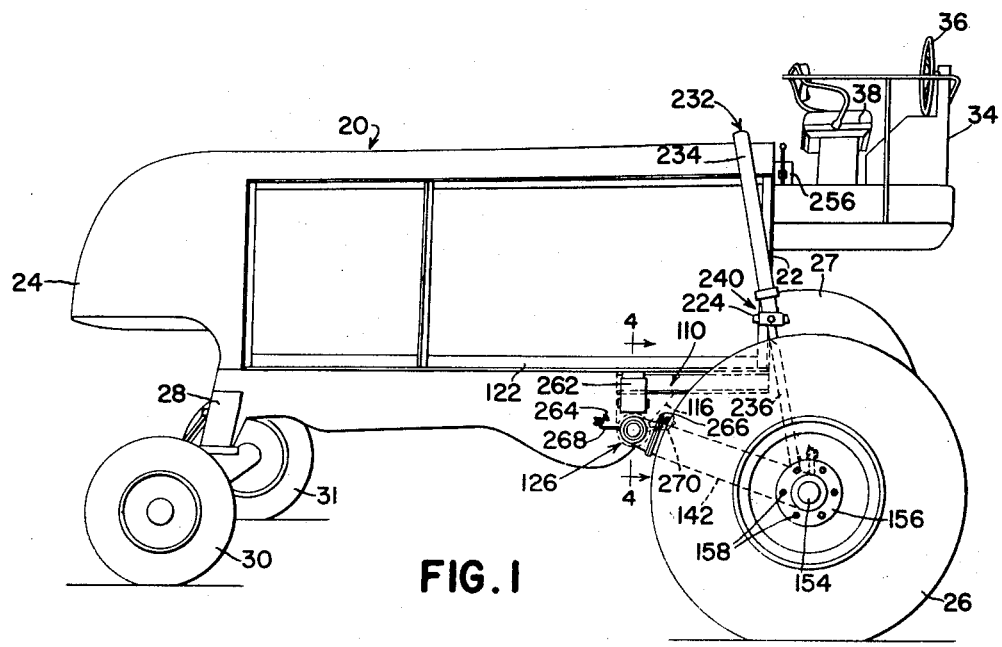
Fig. 1 is a perspective side view of the machine, with the harvesting mechanism omitted.

The subframe 110 may be considered as of generally U-shape as viewed in plan, having a transverse cross member or bight 112 at its front end and a pair of opposite right- and left-hand longitudinal side members 114 and 115. These members are preferably of channel section to afford adequate strength and lightweight construction. The rear ends of the members 114 and 115 have rigidly connected respectively thereto depending supports or brackets 116 and 117 and are further cross-connected by a transverse intermediate member 118 relatively close to the rear ends of the side members. This gives the subframe tremendous structural strength and furthermore establishes the characteristic of unitary design by means of which the subframe may be readily mounted on or dismounted from the body 20. As shown in Fig. 7, the members 114 and 115 have a plurality of bolt-receiving apertures 120 and 121 therein. Opposite sides of the body 20 respectively have supporting members such as the angle iron shown at 122 in Figs. 1 and 4. Bolts, such as that shown at 124 in Fig. 4, may be used as means for securing the subframe to the body. Other means may, of course, be utilized; that shown is merely representative. A longitudinal angle like the angle 122 is used at the left-hand side of the body. Its association with the subframe will be obvious from the description of the connection at 122—114.

The rear end brackets 116 and 117 on the subframe 110 serve to carry a transverse journal member designated in its entirety by the numeral 126. This member or element comprises a rigid torque tube 128 having thereon integral right- and left-hand mounting flanges 130 and 131 removably but rigidly affixed respectively to the supports or brackets 116 and 117 as by bolts, some of which appear at 132 in Figs. 3 and 4. The torque tube 128 terminates at its left-hand end just to the left of the bracket 117, as shown at 135 in Fig. 7, but at its right-hand end includes an integral coaxial extension 134. This design enables the journaling in the torque tube 128 of a transverse shaft 136 which has its left-hand end 137 projecting beyond the left-hand support 117 and which has its right-hand end 138 extending slightly to the right and axially beyond the right-hand end extension 134 of the tube. The shaft 136 is journaled at its right-hand end 138 by any appropriate type of bearing, such as that shown at 140, in the right-hand extension 134 of the tube. A similar bearing (not shown) may journal the left-hand end of the shaft. Bearings in addition to those shown may be used, but the presence or absence thereof is immaterial here. In any event, the shaft 136 is rockable in the tube 128.

A right-hand fore-and-aft extending arm or member 142 has a transverse tubular portion 144 integral with the rear end thereof. This tubular portion is journaled, as by bearings 146, on the main tube extension 134, the arm extending forwardly alongside of the subframe to a front end portion 148 proximate to the inner face of the right-hand front traction wheel 26. A retainer 150 is secured by a pin 152 to the right-hand end 138 of the cross shaft 136. By this means, the wheel-supporting arm 142 is capable of movement in a vertical plane but it has no torque-transmitting connection to the cross shaft 136, as will be obvious from an examination of Fig. 4.

The retainer 150 also holds the shaft 138 against displacement to the left. The left-hand end 137 of the shaft 136 is rigidly fixed to a rear supporting part or end portion 145 of a left-hand fore-and-aft extending wheel-supporting arm 143 for the left-hand traction wheel 27. Except for the differences in the manner of mounting the rear ends 144 and 145 of the wheel-supporting arms 142 and 143, the two arms may be considered identical, or at least symmetrical. The arm 143 has its front end 149 proximate to the left-hand wheel 27. Consequently, the front ends of the arms 142 and 143 are in transverse alinement and the wheels 26 and 27, at least when level, are coaxial. Since the left-hand end 137 of the shaft 136 is rigidly connected to the rear end of the left-hand wheel-supporting arm 143 and since the right-hand end of the shaft is journaled in the right-hand extension 134 of the tube 128, without a rigid connection to the rear end of the right-hand wheel-supporting arm 142, the two arms are capable of vertical movement independently of each other. Stated otherwise, the shaft 136 is not a torque member between the two arms 142 and 143.

The right- and left-hand traction wheels 26 and 27 are driven respectively by reduction gearing (not shown) housed respectively in the forward portions 148 and 149 of the wheel-supporting arms 142 and 143 and respectively including wheel-connected shafts 154 and 155. Any suitable type of bearings (not shown here) may be utilized for journaling the respective shafts.

The right-hand wheel shaft 154 includes an outer end portion in the form of a wheel-mounting hub 156 (Figs. 1 and 3) having thereon a plurality of wheel-mounting studs 158 for carrying the traction wheel 26. Similar structure exists on the left-hand wheel shaft 155, the numeral 157 designating the hub and the numeral 159 designating the wheel-mounting studs for the left-hand wheel 27.

In order that the vertical movement of one of the wheels 26 or 27 may be translated equally but in an opposite direction to the other of the wheels, the present invention features equalizer means preferably in the form of a transverse rigid equalizer bar 160 having a central portion comprising an integral mounting ear 162 and opposite ends including right- and left-hand longitudinal pivots 164 and 165 respectively. The ear 162 is pivotally connected to the subframe 110 on the longitudinal center line of the machine, this pivot being effected by a fore-and-aft pivot member 166 supported at the central portion of the front cross member 112 of the subframe 110. The opposite ends of the equalizer 160 are connected respectively via 164 and 165 to the front ends 148 and 149 of the wheel-supporting arms 142 and 143. The right-hand connecting means comprises a yoke 168 having an upper leg 170 connected to the right-hand end of the equalizer by a pivot or joint at 164 on a fore-and-aft axis spaced above the axis of the wheel shaft 154. A similar yoke 169 effects the connection at the left-hand end of the equalizer 160 to the left-hand arm 143, and this yoke includes an upper member 171 connected to the left-hand end of the equalizer 160 by a ball joint at 165, which joint includes multiple pivot axes spaced above the left-hand wheel shaft 155. The details of the connection are best shown for the left-hand wheel in Fig. 5, wherein it is clear that the forward end portion 149 of the wheel-supporting arm 143 is cylindrical, as at 173, and this cylindrical portion or sleeve is embraced by a pair of depending legs 175 of the yoke 169. These legs are pivotally connected at 177 on a common fore-and-aft axis to a ring 179 journaled on the sleeve 173, which establishes a pivot joint spaced below the joint at 165.

That the construction at the right-hand side is at least symmetrical may be visualized from Fig. 2, where it may be seen that the yoke 168 has legs 174 pivotally joined at 176 to a ring 178 that is journaled on a cylindrical portion or sleeve 172 of the forward portion 148 of the right-hand wheel-supporting arm 142.

As the wheels 26 and 27 move vertically but in opposite directions, they sustain the weight of the front end of the machine by means of the equalizer 160 and the wheel-supporting arms 142 and 143. Since the axis of each wheel travels in an arc about the transverse journal 126 as the wheel oscillates and since the proximate end of the equalizer moves in an arc about the pivot 166, it will be appreciated that there is bound to be some conflict between the front end of the wheel-supporting arm 142 and the right-hand end of the equalizer 160, so far as concerns the fact that these two members move in planes normal to each other. However, this conflict is resolved by the provision of the connecting means comprising the yoke 168 and its components and the pivot or joint 164. The same is true at the left-hand connection 165—169. That is to say, the several axes afforded by 164, 176 and that accomplished by journaling of the ring 178 on the cylindrical portion or sleeve 172 of the front end of the arm 142 permit the equalizer 160 and arm 142 to move in their respective planes without subjection to undesirable forces. Of course, similar results are obtained at the other side of the machine, all of which will be clear without further elaboration.

The self-propelled characterisic of the machine may be introduced by the provision of an internal combustion engine not shown which engine furnishes power for driving the traction wheels 26 and 27 as well as for driving the various components of the threshing and harvesting mechanism. For the purpose of transmitting drive to the wheels 26 and 27, the machine carries at its front end, preferably via the subframe 110, a drive mechanism casing 182 which contains appropriate drive gearing (not shown) for transmitting power equally to right- and left-hand driving or output shafts 184 and 185. The right-hand wheel-driving shaft 154 has an inner portion, barely visible at 186 in Fig. 2, and a similar inner portion 187 is also visible in Fig. 2 for the left-hand wheel-driving shaft 155. The driving and driven shafts 184 and 186 are drivingly interconnected by flexible and telescopic shafting indicated generally by the numeral 188, the details of which will be apparent without elaboration. A similar flexible and telescopic shaft 189 interconnects the driving and driven shafts 185 and 187 at the left-hand side of the machine. Because of the flexible shafting at 188 and 189, oscillation of the wheels 26 and 27 may occur without affecting the drive.

The drive mechanism casing 182 is supported by the subframe through the medium of front and rear hangers 190 and 192 mounted respectively on the subframe front cross member 112 and the subframe intermediate cross member 118. Thus, the drive mechanism casing is an integral part of the unit assembly comprised in the subframe.

The drive mechanism casing has an input shaft 194 to which is keyed an input sheave 196. The sheave 196 is driven in any suitable manner from the internal combustion engine, which means is not shown here but which may take the form of that shown in the U.S. patent to Anderson 2,510,325.

The wheels 30 and 31, in addition to being steerable are also interconnected for vertical movement respectively in opposite directions which may be effected in any suitable manner not material here.

Another feature of the invention is the provision of power means for causing the traction wheels 26 and 27 to move vertically but in opposite directions. A subsidiary phase of this aspect of the invention is the provision of a pair of rigid supports, preferably unitarily associated with the subframe 110 for carrying part of this power means. Such supports are shown as comprising right- and left-hand mounting brackets 224 and 225. The right-hand bracket has a flanged inner end 226 secured, as by cap screws 228, to a forward portion of the subframe 110. The left-hand support 225 is similarly flanged at 227 and secured to the opposite side of the subframe 110 by cap screws 229.

The right-hand bracket or support 224 extends upwardly and laterally and has a bifurcated or forked outer end 230 overhanging or spaced above the front end portion of the right-hand wheel-carrying arm 142. The left-hand support has a similar outer end 231 symmetrically associated with the left-hand wheel-carrying arm 143. The outer ends 230 and 231 of the supports or brackets 224 respectively carry right- and left-hand fluid motors 232 and 233, the former comprising a cylinder 234 and piston rod 236 and the latter comprising a cylinder 235 and piston rod 237. The lower end of the right-hand piston rod 236 is pivotally connected, as at 238 (Fig. 2), to the front end of the wheel-carrying arm 142. The lower end of the piston rod 237 of the left-hand motor 233 is pivotally connected, as at 239 (Fig. 3), to the front end of the left-hand arm 143. The cylinders 234 and 235 are respectively connected to the bifurcated ends 230 and 231 of the supports 224 and 225 by flexible joint means, designated generally and respectively by the numerals 240 and 241. The details of the left-hand joint 241 are shown in Fig. 6, from which it will be seen that the lower end of the cylinder 235 is encircled by a ring-like member 243 having a pair of coaxial pivotal connections 245 with the furcations of the support end 231 and a pair of coaxial pivotal connections 247 with the cylinder 235. The axis of the pivots 245 is normal or at right angles to the axis of the pivots 247, thus producing, in effect, a universal joint. Corresponding details of the right-hand joint 240 will be appreciated from Fig. 3, wherein a ring-like member 242 is shown as having a pivotal connection 244 with the bifurcated end 230 of the support 224. The numeral 246 represents a pivot axis corresponding to the pivot 247. This type of joint, as to each side of the machine, permits free vertical movement of the associated wheel and wheel-carrying arm, taking into consideration the fact that the front end of the arm, and consequently the wheel, swings in an arc, whereas the movement of the piston 236 in the cylinder 234, for example, is necessarily straight-line movement. Nevertheless, as already stated, the manner of articulately connecting the motor 232 to the support 224 and to the front end of the wheel-carrying arm 142 adequately accommodates the arcuate travel of the wheel in such manner that there is no interference with free vertical movement. The same results obtain, of course, at the left-side of the vehicle.

Each of the hydraulic or fluid motors 232 and 233 is of the single-acting type supplied with fluid via cross lines 248 and 250 and alternate supply and return lines 255 and 257 and a control valve 256. Any type of system may be used to satisfy the broad aspects of the invention. The details of the system disclosed here are therefore to be considered only representative. Moreover, since the motors 232 and 233 may be identical, a detailed illustration of the right-hand motor is deemed sufficient for both.

Fig. 8 shows that the lower end of the right-hand motor is enlarged to accommodate a fluid chamber 252 under the control of a spring-loaded check valve 253 and a fluid-actuated plunger 254. The right-hand ends of the lines 248 and 250 are crossed and enter the chamber 252 respectively below and above the plunger 254, and the upper end of the chamber 252 leads to the interior of the cylinder 234 via a passage 252a. The left-hand ends of the lines 248 and 250 enter the left-hand chamber (not shown) respectively above and below the left-hand plunger (also not shown); i.e., the left-hand ends of the lines 248 and 250 are reversed as respects the right-hand ends.

The lines 255 and 257 are alternately supply and return lines, depending upon positioning of the valve 256. For example, if that valve is actuated to supply fluid to the line 250 via 257, that fluid enters the chamber 252, forces the plunger 254 down and opens the check valve 253 to enter the interior of the cylinder 234 via 252a. Fluid in the line 250 cannot enter the left-hand cylinder 235, because the left-hand end of the line 250 is connected below the left-hand plunger (not shown) and the result is that the left-hand check valve (not shown) is positively opened to allow fluid displaced by the piston in the left-hand cylinder to return to the valve 256 via 248 and 257; and such fluid cannot enter the right-hand chamber 252, because the plunger 254 has been forced down as aforesaid. When the valve 256 is actuated to supply fluid to the line 248 via 255, the opposite results are achieved, which is not inconsistent with vertical movement of the wheels 26 and 27 in opposite directions because of the equalizer 160. Although operation of the valve 256 may be effected manually, it is preferred that its actuation be accomplished automatically. Since there are many types of automatic controls and since that illustrated only generally in the present disclosure is not per se a part of the present invention, there is no need for elaboration. Suffice it to say that the automatic control is based on the principle of the variation in the head or height of fluid which is variable according to the transverse slope or angle of the field traversed by the machine.

Part of the automatic control means for the wheel-adjusting motors 232 and 233 includes an electrical control box 262 influenced by stops 264 and 266 carried respectively on arms 268 and 270 that are supported on the pivoted end of the right-hand wheel-supporting arm 142. The means just described (262—264—266—268—270) operates as a safety device for cutting out the hydraulic system as by electrically neutralizing the valve 256 to prevent further operation of the motors 232 and 233, when the wheel-supporting arm 142 has reached its maximum angle relative to the body 20 when pivoting relative to the body about the transverse journal member 126. Again, these details are unimportant in the present case and are described only to orient them with the remainder of the structure.

Operation

When the machine is operated on perfectly level ground, the wheels 26 and 27, as well as the wheels 30 and 31 with respect to each other, will be coaxial. As soon as the machine approaches a slope that is transverse to the line of travel, the entire machine tends to accommodate itself to that slope, but as soon as the body tilts, the automatic control means becomes effective to operate the wheel-adjusting motors 232 and 233 and cause these motors to extend and contract in an appropriate manner. For example, if the tendency of tilt is toward the right-hand side of the machine as illustrated, fluid under pressure will be supplied to the right-hand motor 232 to cause that motor to extend, simultaneously incurring contraction of the left-hand motor in the manner previously described. Since the cylinders of these motors are connected to the body by means of the supports or brackets 224 and 225 and since the pistons are connected to the wheel-carrying arms 142 and 143, the result of operation of the motors is to rock the body generally about a longitudinal horizontal axis until the body reaches a level position, which position will be appreciated by the automatic means which in turn will then discontinue the supply of fluid to the motors 232 and 233. As the wheels 26 and 27 move vertically in opposite directions to accommodate the transverse slope, the equalizer 160 maintains a proportionate amount of travel of the wheels in such vertical directions, thus tying the wheels together to obtain maximum uniform results.

Leveling of the body as the wheels encounter variations in the transverse slope automatically follows as the machine advances. As stated above, the particular type of automatic control means is not material here, but what is material is the equalizer means between the traction wheels 26 and 27, the subframe, the manner of mounting the subframe on the body and the manner in which the several components of the equalizer, drive mechanism, motor supports 224 and 225, etc. are carried by the subframe.

Various other features and advantages of the invention not specifically enumerated herein will undoubtedly occur to those versed in the art, as likewise will many modifications and alterations in the preferred embodiments of the invention illustrated, all of which may be achieved without departing from the spirit and scope of the invention.

What is claimed is:

1. Adjustable wheel mounting structure for a hillside combine having a longitudinal body including front and rear ends, comprising: a pair of laterally spaced apart longitudinal side sills secured to the body at its front ends; a transverse tubular member mounted on the sills in rearwardly spaced relation to the front end of the body and having opposite ends projecting respectively outwardly of the sills; a cross shaft extending coaxially through and journaled in the tubular support member and having opposite ends exposed respectively at opposite ends of said member; a pair of wheel-carrying arms extending fore-and-aft, one at each side of the body, one arm having a rear end secured to one end of the cross shaft and the other arm having a rear end journaled on the opposite end of the tubular support independently of the cross shaft whereby the arms having independent vertical swinging, and each arm further having a front end projecting ahead of the body, said front ends of the arms being transversely alined and each arm journaling at its front end a transverse wheel shaft having an input portion projecting laterally inwardly; a transverse equalizer having a central portion adjacent to the front end of the body and further having opposite ends respectively adjacent to and above the front ends of the wheel-carrying arms; means pivoting the equalizer to the body on the longitudinal centerline of the body; a pair of connecting means, one at each end of the equalizer and articulately connecting the ends of said bar respectively to the front ends of the wheel-carrying arms; a pair of transversely spaced supports, one secured to each sill adjacent to the front end of the body and projecting upwardly and laterally outwardly over the front end of the proximate wheel-carrying arm; and a pair of power-operated, force-exerting devices respectively adjacent to the supports and front ends of said arms, each device including first and second, relatively vertically movable members respectively having vertically spaced articulate connections to the proximate support and associated arm front end.

2. The invention defined in claim 1, including: a cross member extending between and rigidly secured to the side sills at forward portions thereof in transverse alinement with the supports for the force-exerting devices; and said cross member having a central longitudinal pivot constituting the means pivoting the equalizer to the body.

References Cited in the file of this patent

UNITED STATES PATENTS

| 1,131,394 | Loeffler | Mar. 9, 1915 |
| 2,709,329 | Neal | May 31, 1955 |
| 2,780,903 | Kroll et al. | Feb. 12, 1957 |

FOREIGN PATENTS

| 379,926 | Germany | Sept. 1, 1923 |